2,955,996
METHOD OF PRODUCING HYDROPEROXIDES

Fujio Mashio and Shinichi Kato, Kyoto, Japan, assignors to Fine Organics Inc., New York, N.Y., a corporation of New York No Drawing. Filed Sept. 4, 1957, Ser. No. 681,887

14 Claims. (Cl. 204—158)

Many hydrocarbons and other organic compounds are oxidized to the corresponding hydroperoxides, or to the secondary decomposition products of these hydroperoxides, by oxygen gas in the liquid phase. By the present invention there is presented an improved process. This new process is based upon the oxidation of organic compounds by molecular oxygen under the irradiation of ultraviolet rays in the presence of titanium dioxide as an initiator of autoxidation.

It is a known fact that the organic hydroperoxides are useful as catalysts in radical polymerizations, and that many organic compounds, e.g., phenols, ketones, aldehydes and carboxylic acids may be prepared by their decomposition.

Much research has been done on the preparation of hydroperoxides by the liquid phase oxidation of organic compounds (especially hydrocarbons). Since this reaction is based upon the autooxidation of organic compounds by molecular oxygen, and since this reaction proceeds through a free radical mechanism, its rate is promoted by the addition of such compounds as will give free radicals. The following compounds are known as promoters of autooxidation; compounds which produce free radicals on heating, such as diacylperoxides, dialkylperoxides, diaralkylperoxides, azo-compounds and organic hydroperoxides, or substances which catalyze the radical decomposition of the hydroperoxide produced, such as the cobalt or manganese salts of organic or inorganic acids. However, these presently known autooxidation promoters have the following disadvantages:

(1) When a free radical source is used as a promoter it is necessary to run the reaction at high temperatures to make the decomposition of the free radical source occur immediately, and moreover, with the dissipation of the radical source, the effect decreases. Consequently it is impossible to retain a constant effect for an adequate time.

(2) The salts of the heavy metals, which decompose the hydroperoxide produced to form free radicals, can not be used where the hydroperoxide is the desired end product.

(3) In both cases, the loss of hydroperoxide due to thermal decomposition is inevitable, since it is necessary to operate at relatively high temperatures to give a reasonable oxygen absorption rate.

In our method, however, it is possible to avoid the thermal decomposition of hydroperoxide and at the same time to maintain the constancy of the catalytic effect. In our case, the autooxidation is initiated by titanium dioxide which has catalytic properties in photooxidation.

In other words, atomic oxygen, which is released from titanium dioxide by the absorption of ultraviolet rays, initiates the reaction. In general the reaction may be expressed as follows:

Initiation:
$$(TiO_2)_x \rightarrow Ti_xO_2-1+O^*$$
$$O^*+RH \rightarrow R\cdot + \cdot OH$$

Propagation:
$$R\cdot + O_2 \rightarrow ROO\cdot$$
$$ROO\cdot + RH \rightarrow ROOH + R\cdot$$

Termination: $ROO\cdot + ROO\cdot \rightarrow$ stable compound

Where RH and R. indicate a hydrocarbon and the radical produced from it respectively.

Although titanium dioxide (or zinc oxide) partially loses its oxygen by the absorption of ultraviolet rays, it can be reoxidized under an atmosphere of oxygen, and it might therefore be said that its effect is quasi-permanent. In general it is said that the stronger the chalking of the titanium dioxide, the more effective it will be as a catalyst, although this also varies with the method of preparation, surface area and crystalline structure.

The quantity of titanium dioxide to be added preferably is less than 10% of the hydrocarbon. The higher the reaction temperature the better, although temperatures high enough to decompose the produced hydroperoxide must be avoided. A satisfactory temperature is between room temperature and 130° C. For example, in the production of cumene hydroperoxide it is suitable to operate between 50 and 100° C., and in the production of tetralin hydroperoxide, between room temperature and 80° C.

The absorption rate of oxygen is independent of the oxygen partial pressure between 100 and 760 mm. Hg. The reaction can be carried out conveniently between these limits or higher; the photo-oxidation can be effected under constant rate of oxidation.

When a thoroughly purified organic compound is used as a starting material, there is no induction period. Mechanical or gas stirring can be used to suspend the titanium dioxide. For best results the light source should emit ultraviolet rays between 3000 and 4000 A., and for this purpose a mercury lamp is most effective.

The reaction vessel can be made of glass, iron lined with glass, enamel or plastic, aluminum, aluminum alloy, tin or ceramic.

Heavy metals such as cobalt, manganese, chromium, antimony, silver and copper and their salts must not contact the reaction mixture, as these materials would lower the catalytic efficiency of the titanium dioxide, and also decompose the produced hydroperoxide. The ultraviolet source may be placed inside or outside the reaction vessel.

This process is applicable to those organic compounds which yield a peroxide. Olefinic, aromatic, aliphatic, and hydroaromatic hydrocarbons can all be oxidized by this method. This process is applicable to both batch and continuous production.

In the batch process, the organic material to be oxidized and catalytic quantities of titanium oxide are placed in a reaction vessel equipped with an agitator and a reflux condenser, and are elevated to a given temperature while air or oxygen are circulated through the mixture.

The ultraviolet irradiation should be continued during the entire reaction. The concentration of hydroperoxide increases with the absorption of oxygen. In the case of easily oxidizable substances, i.e., cumene, cymene or tetralin, it takes 50–250 hours to reach a concentration of 30–70% hydroperoxide in the reaction mixture. Even at the end of the reaction more than 70% of the absorbed oxygen is converted to hydroperoxide.

In the continuous process, the reaction mixture is moved through a glass or silica tube along with a stream of oxygen, while being heated to a given temperature and irradiated with ultraviolet light. The titanium dioxide may be separated from the effluent by settling or centrifuging and the hydroperoxide extracted by fractional distillation or crystallization as the alkali salt. The unreacted raw material and the titanium dioxide may be recycled.

It is advisable, from the point of view of safety, to keep the concentration of hydroperoxide at less than half the maximum possible concentration.

To raise the catalytic power of titanium dioxide, the addition of a trace of iron, niobium, tantalum, tungsten or their compounds is effective.

*Example 1.*—Tetralin is placed in a flat bottom glass flask with 1% titanium dioxide. The flask is placed in a constant temperature bath and connected with a constant pressure oxygen source. The reaction mixture is stirred with a suitable stirrer, for example at 200–1000 r.p.m. The flask is filled with oxygen, the mixture brought to 50° C., and the mercury lamp turned on. The rate of oxygen absorption is 0.06 mol/kg./hr., and upon about 34 hours the concentration of hydroperoxide reaches 21.6% which corresponds to about 90% of the absorbed oxygen. Preferably the volume of oxygen is maintained somewhat in excess of the theoretical amount required. The titanium dioxide used in this example was of middle class activity, as hereinafter explained.

*Example 2.*—This reaction is run exactly as Example 1 except that cumene is used instead of tetralin. The rate of oxygen absorption in this case is 0.024 mol/kg./hr. Upon three days of the reactor the concentration of cumene-hydroperoxide reaches about 60%, which corresponds to about 90% of the absorbed oxygen.

*Example 3.*—An enameled or glass lined vessel equipped with a high pressure mercury lamp is used as a reaction vessel. p-Cymene with 1% titanium dioxide is oxidized at 85° C. by circulation of a strong stream of oxygen. The rate of oxygen absorption is 1.5 l./kg./hr., and at about 80 hrs. the concentration of p-cymene hydroperoxide is 55%. The titanium dioxide is separated with a centrifuge, the unreacted p-cymene is recovered by vacuum distillation at 30–35° C., and 72% crude hydroperoxide is obtained.

*Example 4.*—Same as Example 3 but using tetralin with 1% of highly active titanium dioxide. The reaction is run at 60° C. Oxygen absorption rate is 2.3 l./kg./hr. and at about 20 hours the tetralin hydroperoxide concentration reaches 30%. The titanium dioxide is removed, the reaction mixture diluted with toluene, and cooled to —40 to —30° C. The hydroperoxide crystallizes out.

*Example 5.*—Same as Example 1 but using ethylbenzene with 2% tianium dioxide of middle activity, the rate of oxygen absorption being 0.014 mol/kg./hr., and after about 24 hrs. the hydroperoxide content reaching 5%, which corresponds to 84% of the absorbed oxygen. The hydroperoxide can be concentrated to 75% by vacuum distillation.

*Example 6.*—Same as Example 1 but using diphenylmethane and 1% titanium dioxide of middle activity at 80° C., the quantity of oxygen absorbed being 0.24 mol/kg. in about 10 hours, the hydroperoxide formed corresponding to 87% of the absorbed oxygen.

*Example 7.*—Same as Example 3, but using high activity titanium dioxide, at 90° C., the quantity of oxygen absorbed being 85 l./kg. in about 50 hours, and the hydroperoxide concentration reaching 44%. Vacuum distillation at 30–35° C. yields a 77% crude product.

*Example 8.*—Same as Example 3, but using cyclohexene with 1% high activity titanium dioxide at 50° C. Rate of oxygen absorption is 5.4 l./kg./hr. and the concentration of hydroperoxide is 39% after 20 hours. Vacuum evaporation yields an 80% pure product.

The various grades of commercially available titanium dioxide have been found to have widely varying photocatalytic activity. In order to determine the photocatalytic effect of a particular grade of titanium dioxide, the following test procedure may be used.

Any one of the reactions described herein is run using one gram of titanium dioxide as catalyst, ultraviolet light of 3656 A., and a radiation of $10^{-8}$ Einstein units/sec. Samples are withdrawn and analyzed at suitable intervals. From the results of these analyses, the reaction rate may be calculated.

In this specification, the following system of classification of the activity of titanium dioxide has been used:

| Reaction Rate of Initiation | Activity Class |
| --- | --- |
| Above $10 \times 10^{-9}$ mol/sec | High. |
| Between $3 \times 10^{-9}$ mol/sec. and $10 \times 10^{-9}$ mol/sec | Middle. |
| Below $3 \times 10^{-9}$ mol/sec | Low. |

Having described our invention, what we claim and desre to secure by Letters Patent is as follows:

1. The process which comprises subjecting a hydrocarbon in the liquid phase having an oxidizable carbon atom selected from the group consisting of secondary and tertiary carbon atoms adjacent a member of the group consisting of —CH=CH— and an aromatic group, to the action of a gaseous oxygen-containing gas in the presence of a catalytic amount of titanium dioxide and in the presence of ultraviolet light said catalytic amount ranging from about 1% to not more than 10% based on the weight of the hydrocarbon, whereby the hydrocarbon is oxidized to the hydroperoxide, and recovering the formed hydroperoxide therefrom.

2. The process in accordance with claim 1 wherein the oxidation is carried out at a temperature in the range of from room temperature to 130° C., and at a pressure in the range of 100 mm. Hg to super atmospheric pressure.

3. The process in accordance with claim 1 wherein the oxidation is carried out at constant rate.

4. The process in accordance with claim 1 wherein the wave length of the ultraviolet light is in the range of 3000–4000 A.

5. The process in accordance with claim 1 wherein the gaseous oxygen-containing gas is a member of the group consisting of pure oxygen, air and oxygen in admixture with an inert gas.

6. The process in accordance with claim 1 wherein the gaseous oxygen-containing gas is introduced into the reaction zone at a rate to maintain the oxygen partial pressure at at least 100 mm. Hg.

7. The process in accordance with claim 1 wherein the amount of the titanium dioxide does not exceed 10%.

8. The process in accordance with claim 1 wherein the amount of the titanium dioxide is about 1%.

9. The process in accordance with claim 8 wherein the hydrocarbon is cumene.

10. The process in accordance with claim 8 wherein the hydrocarbon is p-cymene.

11. The process in accordance with claim 8 wherein the hydrocarbon is tetralin.

12. The process in accordance with claim 8 wherein the hydrocarbon is ethylbenzene.

13. The process in accordance with claim 8 wherein the hydrocarbon is diphenylmethane.

14. The process in accordance with claim 8 wherein the hydrocarbon is cyclohexene.

References Cited in the file of this patent

Jacobsen: Industrial and Engineering Chemistry, vol 41, No. 3 (March 1949), pp. 523–526.